Dec. 28, 1926.                                                                  1,611,954
C. A. SCHELL
FLEXIBLE COUPLING AND DISK THEREFOR
Filed July 12, 1921
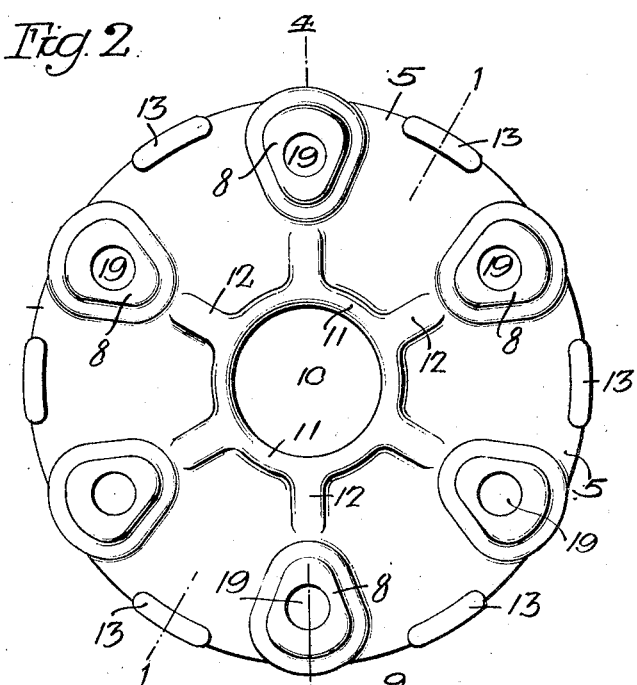
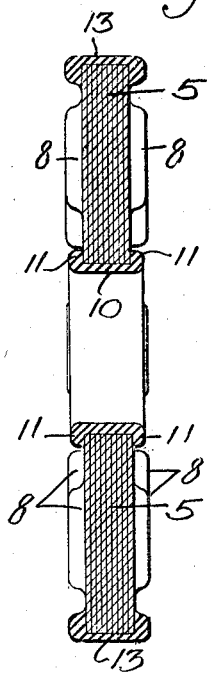
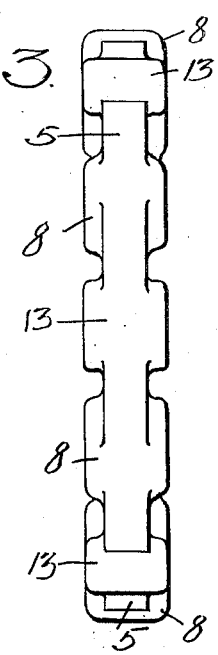
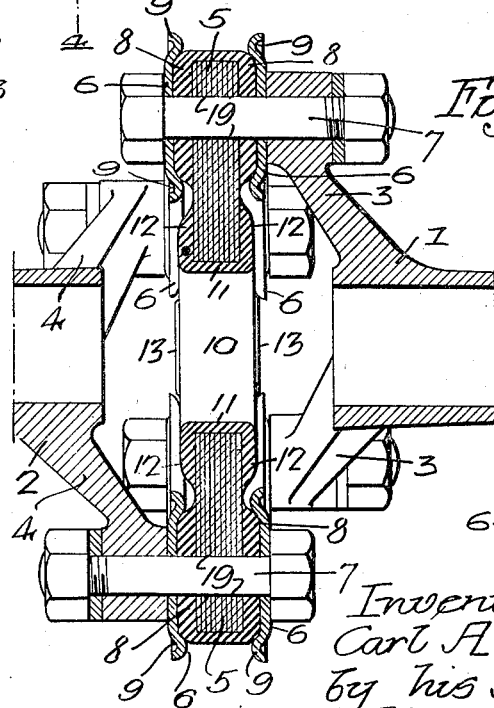
Inventor:
Carl A. Schell
by his Attorneys Patented Dec. 28, 1926.

1,611,954

UNITED STATES PATENT OFFICE.

CARL A. SCHELL, OF CLEVELAND, OHIO, ASSIGNOR TO THERMOID RUBBER COMPANY, OF HAMILTON TOWNSHIP, NEW JERSEY, A CORPORATION OF NEW JERSEY.

FLEXIBLE COUPLING AND DISK THEREFOR.

Application filed July 12, 1921. Serial No. 484,255.

One object of my invention is to improve the construction of a flexible coupling and the flexible disk to which the spiders of the coupling are attached in order to drive the disk with a positive gripping surface.

A further object of the invention is to make a neat fit between the parts, allowing no play, and to keep the whole assembly tight.

A still further object of the invention is to reinforce the disk at the center and to provide pads at the outer edge of the disks so as to keep the plies from separating.

These objects I attain in the following manner, reference being had to the accompanying drawings, in which:

Fig. 1 is a sectional view of a flexible coupling, showing the disk in section on the line 1—1, Fig. 2;

Fig. 2 is a side view of the disk;

Fig. 3 is an edge view;

Fig. 4 is a sectional view of the disk on the line 4—4, Fig. 2, and

Fig. 5 is a face view of one of the washers.

Referring to the drawings, 1 and 2 are spiders. One of these spiders is attached to the driving shaft and the other is attached to the driven shaft. In the present instance, the spider 1 has three arms 3 and the spider 2 has three arms 4. The arms of one spider alternate with those of the other, as shown. The disk 5 is made of fabric and rubber, or similar vulcanizable adhesive material so that, when the disk is vulcanized under pressure, the several layers of the disk are firmly held together by the material.

In order to provide a gripping surface for the washers 6, which are mounted on the bolt 7 secured to the arms of the spiders, pads 8, of rubber, are formed at the bolt holes 19. These pads are shaped to conform to the shape of the washers. In the present instance, the washers have a rounded flange 9, which fits snugly over the rounded edges of the pads, as clearly shown in Fig. 4. By arranging the pads in the manner shown, a pressure, due to the clamping of the bolt, will tend to distort the rubber laterally, the result being a snug fit between the washers and the disk, allowing no play. The disk is reinforced at the central opening 10 by a rim 11 of rubber having radial portions 12, which extend towards the holes 19. At the periphery of the disk, between the several pads 8, are pads 13, which extend over the edge of the disk and keep the plies of the disk from separating.

While the disk, hereinbefore described, is mainly intended for a coupling having a single flexible disk, it will be understood that two or more disks of this type may be assembled between the spiders without departing from the essential features of the invention.

Although the disk is made of a series of plies of fabric and rubber, the body of the disk may be made in any manner desired without departing from the spirit of the invention.

I claim:

1. The combination in a flexible coupling, of two spiders; a flexible disk mounted between the two spiders; bolts extending through the disk and securing the spiders to the disk, the disk having rubber pads forming enlargements at the bolt holes, said pads extending over the edge of the disk, the pad on one side being united to a corresponding pad on the opposite side of the disk; and washers having rounded flanges, the pads conforming to the shape of the washers.

2. A disk for a flexible coupling, said disk consisting of a series of layers of fabric and vulcanizable material, said disk having a central opening and a series of holes surrounding the opening; pads, of rubber, at each opening forming a reinforcing means; and a rim of rubber at the central opening reinforcing the disk at this point and tending to prevent the separation of the plies of material.

3. A disk for a flexible coupling, consisting of a series of layers of fabric and vulcanizable material; and means extending over the edge from side to side of the fabric tending to prevent separation of the plies of material at the periphery of the disk.

4. A disk for a flexible coupling, consisting of a series of layers of fabric and vulcanizable material, said disk having a central opening and having means extending over the edge of the opening from side to side of the fabric; and pads at each side of the disk at the bolt holes, the pads being connected over the edge of the disk, preventing the separation of the plies of material at the opening and at the periphery of the disk.

5. A disk for a flexible coupling, said disk consisting of a series of layers of fabric and vulcanizable material, said disk having bolt holes therein; and pads at each side of the disk at the bolt holes, the pads being connected over the edge of the disk.

6. A disk for a flexible coupling, said disk consisting of a series of layers of fabric and vulcanizable material; a number of bolt holes in the disk spaced apart; and means extending over the edge of the disk between the bolt holes and tending to prevent the separation of the plies of material.

7. A disk for a flexible coupling having a central opening and a series of holes for the passage of securing bolts by which the disk is secured to the spiders of the coupling, the disk having a rim surrounding the central opening, said rim preventing the plies of material from separating and also having rubber pads at the periphery between the bolt holes for preventing the plies of material separating at the periphery.

8. A flexible disk for couplings made of fabric and rubber, said disk having a central opening and a series of holes for the passage of securing bolts; pads of rubber surrounding the bolt holes; a rim of rubber enclosing the walls of the opening, said rim having radial projecting portions; and pads at the periphery between the bolt holes, which prevent the plies of material separating at the periphery.

CARL A. SCHELL.